United States Patent
Eldar et al.

(10) Patent No.: US 7,346,909 B1
(45) Date of Patent: Mar. 18, 2008

(54) NETWORK-LIKE COMMUNICATION AND STACK SYNCHRONIZATION FOR DIFFERENT VIRTUAL MACHINES ON THE SAME PHYSICAL DEVICE

(75) Inventors: Avigdor Eldar, Jerusalem (IL); Omer Levy, Rehovot (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/511,695

(22) Filed: Aug. 28, 2006

(51) Int. Cl.
G06F 3/00 (2006.01)
G06F 9/44 (2006.01)
G06F 9/46 (2006.01)
G06F 13/00 (2006.01)

(52) U.S. Cl. .................. 719/312; 719/317; 709/202; 709/213

(58) Field of Classification Search ............. 719/312, 719/317, 324, 318; 718/1; 709/202, 213, 709/214
See application file for complete search history.

(56) References Cited

U.S. PATENT DOCUMENTS

| | | | | |
|---|---|---|---|---|
| 5,408,617 A | * | 4/1995 | Yoshida | 719/319 |
| 6,119,170 A | * | 9/2000 | Schoffelman et al. | 709/244 |
| 7,111,303 B2 | * | 9/2006 | Macchiano et al. | 719/313 |
| 7,213,246 B1 | * | 5/2007 | van Rietschote et al. | 718/1 |
| 7,251,815 B2 | * | 7/2007 | Donovan et al. | 718/105 |
| 7,254,815 B2 | * | 8/2007 | Laschkewitsch et al. | 719/318 |
| 7,260,599 B2 | * | 8/2007 | Bauch et al. | 709/202 |
| 2003/0065676 A1 | * | 4/2003 | Gbadegesin et al. | 707/104.1 |
| 2004/0083481 A1 | * | 4/2004 | Shultz et al. | 719/312 |
| 2005/0102671 A1 | * | 5/2005 | Baumberger | 718/1 |
| 2005/0114855 A1 | * | 5/2005 | Baumberger | 718/1 |
| 2005/0246718 A1 | * | 11/2005 | Erlingsson et al. | 719/317 |
| 2005/0251808 A1 | * | 11/2005 | Gbadegesin et al. | 719/310 |
| 2007/0124310 A1 | * | 5/2007 | Mathur | 707/10 |
| 2007/0180088 A1 | * | 8/2007 | Zhao | 709/223 |

* cited by examiner

Primary Examiner—William Thomson
Assistant Examiner—KimbleAnn Verdi
(74) Attorney, Agent, or Firm—Schwabe, Williamson & Wyatt, P.C.

(57) ABSTRACT

Embodiments include methods, apparatuses, articles, and systems having a plurality of agents of a plurality of virtual machines of a physical device. In various embodiments, first and second agents of first and second virtual machines are adapted to cooperate to ensure that a port of the physical device is listened to by only a first application of the first virtual machine and by the second agent of the second virtual machine. Also, the first and second agents are further adapted to cooperate to facilitate the first application and a second application of the second virtual machine in communicating with each other in a network-like manner.

28 Claims, 3 Drawing Sheets

NETWORK-LIKE COMMUNICATION AND STACK SYNCHRONIZATION FOR DIFFERENT VIRTUAL MACHINES ON THE SAME PHYSICAL DEVICE

TECHNICAL FIELD

Embodiments relate to the fields of data processing and data communication, in particular, to methods and apparatuses for facilitating network-like communication between processes of different virtual machines on the same physical device and for synchronizing network communication stacks of the virtual machines.

BACKGROUND

Continuous advancements in virtualization and multiprocessor core technology have given rise to new computing topologies requiring efficient communication between processes of different virtual machines on the same physical device. Traditionally, two processes engaging in network-like communication, such as client and server processes, may send and receive data through network communication stacks, such as transmission control protocol (TCP) and user datagram protocol (UDP) stacks. If the processes are processes of different computer systems connected by a network, each machine may be assigned an Internet Protocol (IP) address, and each process, a TCP/UDP port number. The IP addresses and ports are then used to identify the processes to each other across the network. If the processes are processes of the same computer system, the processes may only be identified by a port number and a special IP address (typically "127.0.0.1") that may be used to inform the network communication stack that the destination process is local.

Virtualization technology allows two or more virtual machines to operate simultaneously on the same physical device while appearing to each other to be different physical devices. Each virtual machine may use its own network communication stack to facilitate its processes in communicating with processes of other virtual machines and devices. Often, communication between two processes of different virtual machines on the same device is facilitated by assigning each virtual machine a dummy IP address and allowing the virtual machines to communicate as if they were separate physical devices. However, like traditional communication across a network, the virtual machines on the same physical device may be unable to communicate if connectivity to the external network is impaired.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods performed by, and apparatuses having a plurality of agents of a plurality of virtual machines of a physical device. In various embodiments, first and second agents of first and second virtual machines are adapted to cooperate to ensure that a port of the physical device is listened to by only a first application of the first virtual machine and by the second agent of the second virtual machine. Also, the first and second agents are further adapted to cooperate to facilitate the first application and a second application of the second virtual machine in communicating with each other in a network-like manner.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
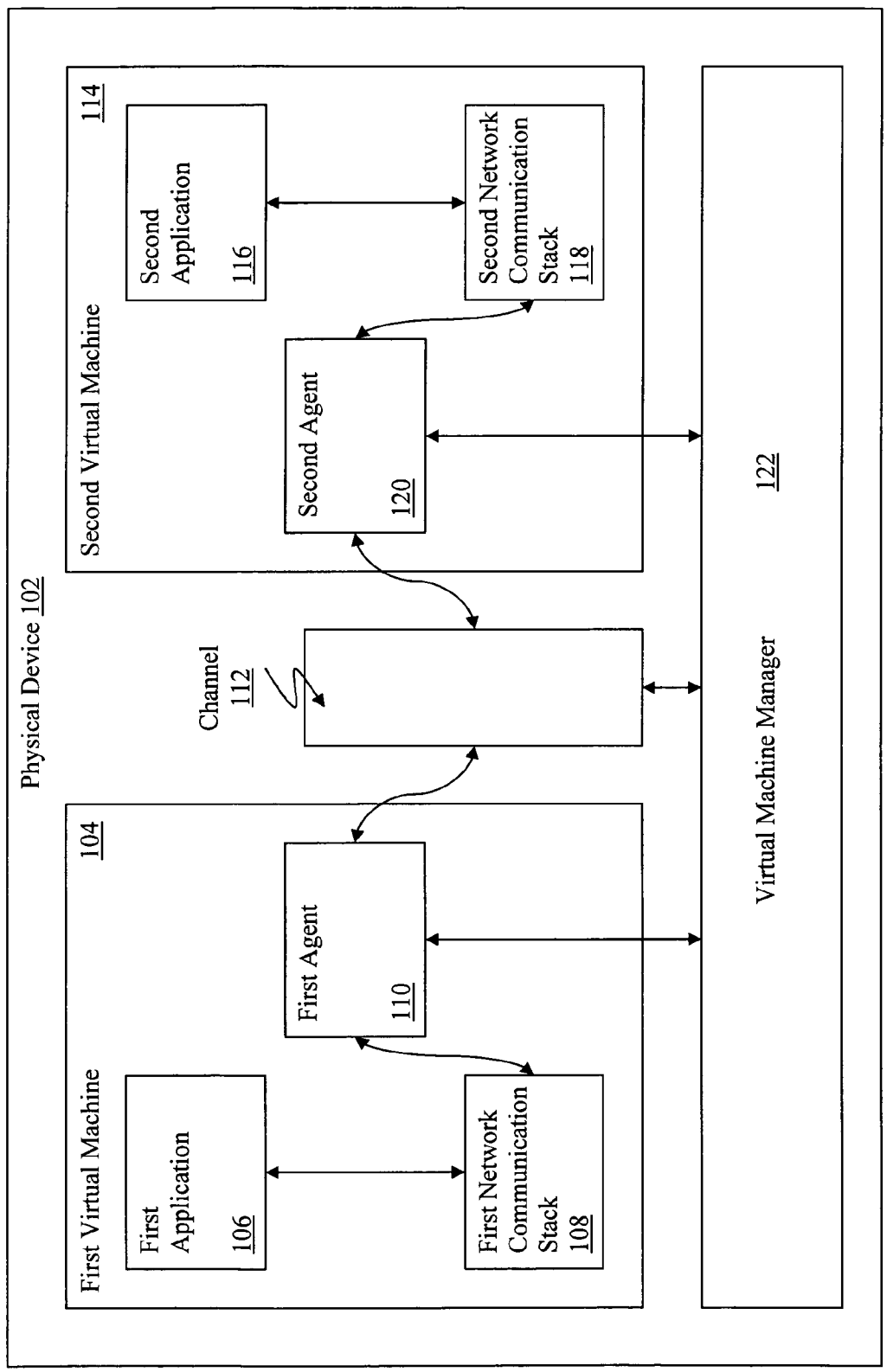
FIG. 1 illustrates an overview of various embodiments of the present invention, facilitating network-like communication between processes of different virtual machines on the same physical device and synchronizing network communication stacks.

FIG. 1 illustrates an overview of various embodiments of the present invention, facilitating network-like communication between processes of different virtual machines on the same physical device and synchronizing network communication stacks. As illustrated, platform or physical device 102 comprises at least two virtual machines, first virtual machine 104 and second virtual machine 114. Each of first virtual machine 104 and second virtual machine 114 includes a first/second agent 110/120. The first and second agents 110 and 120 may be adapted to cooperate to facilitate network-like communication between processes of the virtual machines 104/114, the first agent 110 acting as a proxy for processes of the second virtual machine 114 and the second agent 120 acting as a proxy for processes of the first virtual machine 104. Also, the first and second agents 110 and 120 may be adapted to cooperate to synchronize the network communication stacks of the virtual machines 104/114.

In addition to the first and second virtual machines 104 and 114, the physical device 102 may also comprise a virtual machine manager 122 (hereinafter, "VMM 122") capable of communicating with the first and second agents 110 and 120 of the first and second virtual machines 104 and 114 and of allocating a channel 112, which may comprise a low-level, sharable memory page. Each of the first and second virtual machines 104 and 114 may comprise one or more applications in addition to the first/second agent 110/120, such as first application 106 of the first virtual machine 104 and second application 116 of the second virtual machine 114, capable of engaging in network-like communication through the network communication stacks of their respective virtual machines, such as the first network communication stack 108 (hereinafter, "first stack 108") of first virtual machine 104 and the second network communication stack 118 (hereinafter, "second stack 118") of the second virtual machine 114.

Figure 3:
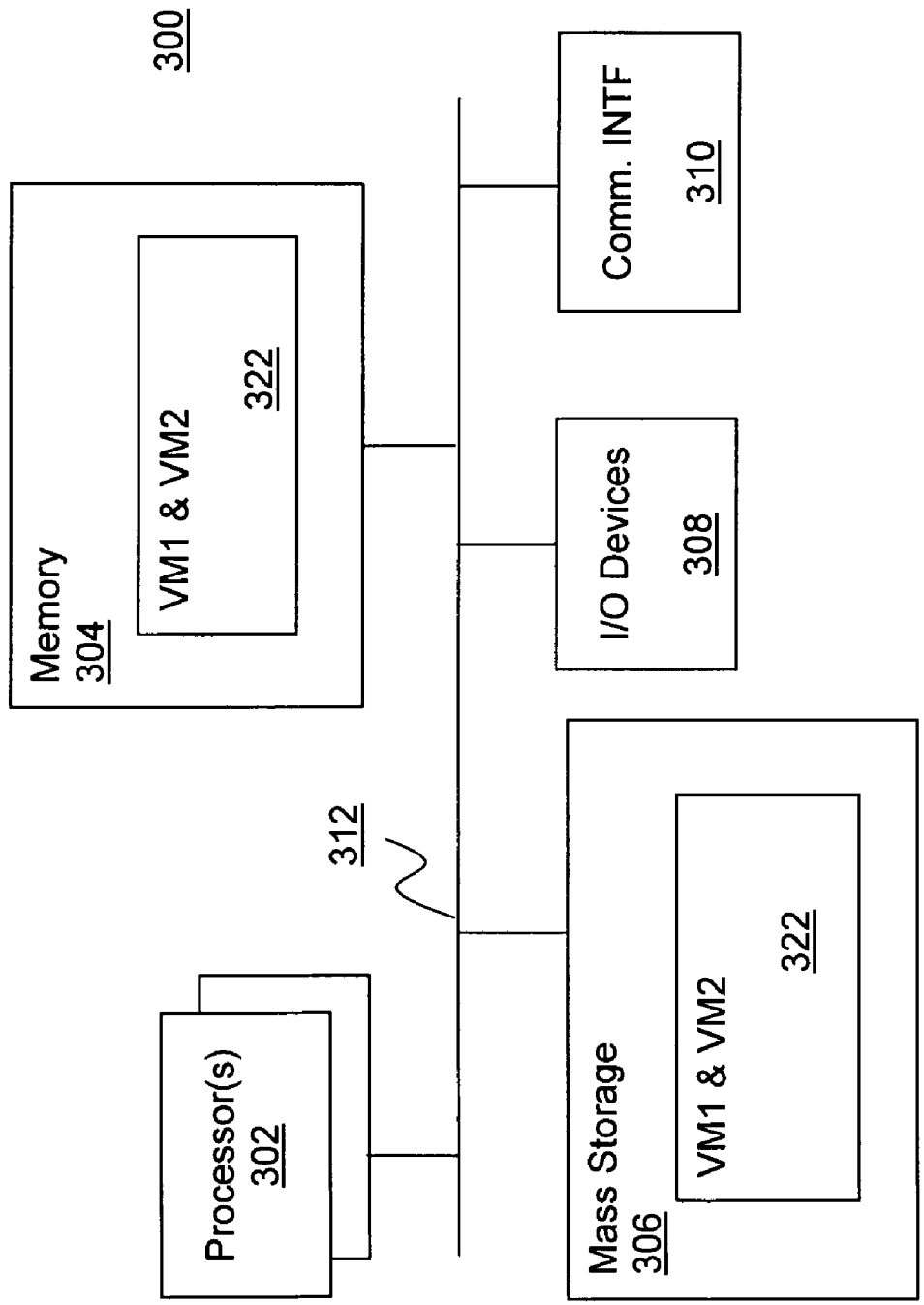
FIG. 3 illustrates an example computer system suitable for use to practice various embodiments of the present invention.

In various embodiments, physical device 102 may be any single- or multi-processor or processor core central processing unit (CPU) computing system known in the art. Physical device 102 may be a personal computer (PC), a workstation, a server, a router, a mainframe, a modular computer within a blade server or high-density server, a personal digital assistant (PDA), an entertainment center, a set-top box or a mobile device. The physical device 102 may be capable of operating a plurality of operating systems in a plurality of virtual machines using virtualization technologies. If physical device 102 is a multi-processor or multi-processor core system, each virtual machine of physical device 102 may be coupled to a processor or processor core dedicated to that virtual machine. In a single processor or single processor core physical device 102, the plurality of virtual machines may share the single processor or processor core. An exemplary single-/multi-processor or processor core physical device 102 is illustrated by FIG. 3, and is described in greater detail below. Hereinafter, including in the claims, processor and processor core shall be used interchangeable, with each term including the other.

As shown and alluded to earlier, physical device 102 may comprise a plurality of virtual machines, such as first virtual machine 104 and second virtual machine 114. First and second virtual machines 104 and 114, except for the teachings of embodiments of the present invention, may be any sort of virtual machines. Each of first and second virtual machines 104 and 114 may be a self-contained operating environment that behaves as if it is a separate computer system. To an outside system coupled to physical device 102 through a networking fabric, each of first and second virtual machines 104 and 114 may appear to be a separate computing device. First and second virtual machines 104 and 114 may also appear to be separate computing devices to each other, each having its own network communication stack, such as first stack 108 of first virtual machine 104 and second stack 118 of the second virtual machine 114, to facilitate the first and second virtual machines 104 and 114 in communicating with each other and with other virtual machines/physical devices. First and second virtual machines 104 and 114 may also each have an operating system capable of managing multiple processes, such as first application 106 and first agent 110 of first virtual machine 104, and second application 116 and second agent 120 of second virtual machine 114, and may each have a protected memory space that operationally belongs exclusively to that virtual machine. Suitable virtual machines and virtualization technologies include but are not limited to those available from Microsoft Corporation of Redmond, Wash., VMware, Inc. of Palo Alto, Calif., and XenSource of Cambridge, UK.

In some embodiments, the physical device 102 may further comprise a VMM 122, which may have a service operating system (OS) (not shown) and an application programming interface (API) to facilitate processes of the first and second virtual machines 104 and 114 in communicating with the VMM 122. The VMM 122 may comprise a service partition of the physical device 102, managing the actual hardware resources of device 102, including memory pages such as the low-level, sharable memory page serving as the channel 112, and coordinating the use of the resources between the first and second virtual machines 104 and 114.

As is shown, VMM 122 may receive requests via its API from the first and/or second agents 110 and 120 for the memory location of the channel 112, which may be a low-level, persistent, sharable memory page. In one embodiment, both first and second agents 110 and 120 may request the memory location of the channel 112 at startup. In another embodiment, only one of first and second agents 110 and 120 may request the memory location of the channel 112, and may further request that the VMM 122 inform the other of the first and second agents 110 and 120 of the memory location of channel 112. In yet another embodiment, first and/or second agents 110 and 120 may request that the VMM 122 allocate a new, low-level, sharable memory page to serve as channel 112.

Also, VMM 122 may receive, through its API, notifications from the first and/or second agents 110 and 120 that data, a message, and/or a notification has been stored in the channel 112. In response, the VMM 122 may inform the other of the first and second agents 110 and 120 of the store operation, thus facilitating the first and second agents 110 and 120 in communicating with each other via the channel 112.

As illustrated, channel 112 may be a low-level, sharable memory page of the physical device 102. In some embodiments, the channel 112 is a persistent memory page known to the VMM 122 at start up. In other embodiments, the channel 112 is allocated by the VMM 122 in response to a request by the first and/or second agents 110 and 120. Channel 112 may be capable of storing data as a buffer, and of storing notifications and messages, thus facilitating the first and second agents 110 and 120 in communicating with each other.

In various embodiments, first and second virtual machines 104 and 114 may each comprise one or more applications, such as first application 106 of first virtual machine 104 and second application process 116 of second virtual machine 114. First and second applications 106 and 116 may be any sort of processes capable of sending and receiving data in a network-like manner. For example, first application 106 may be a server process and second application 116 may be a client process. At start up or some later time, server/first application 106 may make a listen request of the first stack 108 requesting to listen at a certain port of the physical device 102. The listen request may specify the number of the port, or simply request any port, allowing the first stack 108 to assign the port. If the port specified/assigned is available, the first application 106 may be added to a port table of the first stack 108 as listening at the specified/assigned port.

Further, client/second application 116 may request to connect to server/first application 106, determining the IP address of the first application 106 in any manner known in the art, such as requesting that a domain name server (DNS) provide the IP address of the server/first application 106. The IP address provided to the client/second application 116 in response may be the same as the client/second application 116's IP address since both the first and second applications 106 and 116 are on the same physical device 102 and therefore may share the same IP. Second application 116 may also be provided with the port number at which the first application 106 is listening. Upon receiving the IP address and port number, second application 116 may send a request to the second stack 118 requesting connection to the first application 106. As will be described in more detail below, two connections may be established in response: a first connection between the second application 116 and the second agent 120, and a second connection between the first agent 110 and the first application 106. The first application 106 may receive a request for connection from the first agent 110 through the first stack 108, the first agent 110 acting as a proxy for the second application 116. In response to the request, the first application 106 may initialize and bind a socket to abstract the connection, the socket capable of reading and writing transmit/receive data.

In some embodiments, upon establishing the connections, either or both of the first and second agents 110 and 120 may transmit data to the other. First application 106 may send data to a socket abstracting the second connection, and receive data through that socket; and second application 116 may send data to a socket abstracting the first connection, and receive data through that socket.

Also, first application 106 may send a stop listening request to first stack 108 notifying the first stack 108 that it will no longer receive connections through the port at which it has been listening. In response, the first stack 108 may update the port table to indicate that first application 106 is no longer listening, and the first and second connections may be terminated in the manner discussed below.

In other embodiments, first application 106 may be a client and second application 116 may be a server, each performing the operations described above for the other application. Each of first and second applications 106 and 116 may perform some, all, or none of the above operations.

As illustrated, first and second virtual machines 104 and 114 may each comprise a network communication stack, such as first stack 108 of first virtual machine 104 and second stack 118 of second virtual machine 114. The first and second stacks 108 and 118 may be any sort of network communication stacks known in the art, such as TCP stacks and/or UDP stacks. Each stack 108/118 may have an associated port table listing each of the applications listening at each port, and may be capable of updating that table in response to listen or close requests requesting to listen at a port or to stop listening at a port. Each stack 108/118 may also be capable of forwarding a connection request or data to a given IP/port address combination, in the manner known in the art. In one embodiment, each time the port table is updated, the stack 108/118 having the updated table may notify the agent 110/120 of its respective virtual machine 104/114.

As is shown, first and second virtual machines 104 and 114 may also each comprise an agent to facilitate communication between processes of the virtual machines 104 and 114 and to synchronize the network communication stacks of the virtual machines 104 and 114. First virtual machine 104 may include a first agent 110, and second virtual machine 114 may include a second agent 120.

In some embodiments, first and second agents 110 and 120 may each initialize the channel 112 at start up. Each agent 110/120 may request the memory location of channel 112 from the VMM 122 through the API of the VMM 122. In various embodiments, the API of VMM 122 is known to the first and second agents 110 and 120. In response, the first and second agents 110 and 120 may each receive the memory location of the channel 112, and may utilize the channel 112 to communicate with the other of the first and second agents 110 and 120. In another embodiment, only one of the first and second agents 110 and 120 may request the memory location of channel 112 at startup, and may request that the VMM 122 notify the agents of other virtual machines of the memory location of the channel 112.

In various embodiments, first and second agents 110 and 120 may be adapted to cooperate to ensure that only a first application 106 and the second agent 120 listen at the same port, thereby synchronizing first and second stacks 108 and 118. Referring to the example provided above of first application 106 acting as a server and second application 116 acting as a client, the first agent 110 may trap the listen request made by first application 106. First agent 110 may trap the addition of a listening process in a number of ways. In some embodiments, first agent 110 may periodically check the port table of first stack 108 to determine if any ports have been added or removed. In other embodiments, first agent 110 may be notified each time a port is added or deleted from the port table. The notification may be provided by the first stack 108 or by some other process monitoring the first stack 108 and its port table. If any new applications are listening at new ports, such as first application 106 listening at a specified/assigned port, first agent 110 may generate a listen notification and may store the notification in the channel 112. The notification may include the identity of the first application and the port number that the first application is listening at, as well as a type field indicating that the stored notification is notification of a listen event. Upon storing the notification, first agent 110 may further notify the VMM 122 through the API of the VMM 122 that something has been stored in the channel 112 (the notification to VMM 122 may specify what has been stored in channel 112, but need not do so). VMM 122 may then notify second agent 120, through the API of VMM 122, that something has been stored in the channel 112. Second agent 120 may then retrieve and process the stored notification. In response, second agent 120 may send a listen request to second stack 118 requesting to listen at the port at which first application 106 is listening. Second stack 118 may then update its port table to reflect that second agent 120 is listening at the port. Second agent 120 may then listen on second stack 118 on behalf of first application 106, ensuring that all communications, such as data and connect requests, to the port are routed to the first application 106. Thus, by listening at ports on behalf of processes of virtual machines other than their own, first and second agents 110 and 120 ensure that the stacks of all virtual machines have the same list of ports being listened to by applications, thereby synchronizing the stacks.

In some embodiments, first and second agents 110 and 120 may be adapted to cooperate to facilitate network-like communication between the first application 106 and the second application 116, with the first agent 110 acting as a proxy for the second application 116 and the second agent 120 acting as a proxy for the first application 106. Continuing to refer to the above example with first application 106 acting as a server and second application 116 acting as a client, first and second agents 110 and 120 may facilitate second application 116 in establishing a network-like connection with the first application 106. Second agent 120 may first receive a forwarded connect request from second stack 118, the request made by second application 116. Second agent 120 may receive the forwarded request because second agent 120 is listening at the same port on second stack 118 as the first application 106 is listening on first stack 108, the second agent 120 listening on behalf of the first application 106. Upon receiving the connection request, second agent 120 may establish a first connection by creating a socket abstracting the connection. The use of sockets to abstract connections is well known in the art.

The second agent 120, after establishing the first connection, may create a context to identify the connection and associate the context with the socket. The context may comprise, for example, 1) the IP address and the port of first application 106 to which the connection request is directed, 2) an indication of whether the second application 116 is local or remote (here, it is local), and 3) an indication of the communication protocol used (TCP or UDP). Next, the second agent 120 may generate a notification of the connection request comprising the above mentioned context and a field indicating the type of notification being generated, and may store the notification in the channel 112. Upon storing the notification in the channel 112, second agent 120 may further notify the VMM 122 through the API of the VMM 122 that something has been stored in the channel 112 (the notification to VMM 122 may specify what has been stored in channel 112, but need not do so). VMM 122 may then notify first agent 110, through the API of VMM 122, that something has been stored in the channel 112.

In some embodiments, the first agent 110 may then retrieve and process the notification. First agent 110, acting as a proxy for second application 116, may next request a connection to first application 106, directing the request for connection to the first stack 108. First stack 108 may then forward the connection request to the first application 106, which may establish a second connection between the first application 106 and the first agent 110, and may create another socket to abstract the second connection. First agent 110 may then map the other socket to the above described context, thus allowing the context to uniquely identify the connections associated with the two sockets.

As is further illustrated, first and second agents 110 and 120 may send data to and receive data from each other. First application 106 may write data to the socket abstracting the second connection, and the first agent 110 may then read the data from the socket on behalf of the second application 116 to which the data is being transferred. The first agent 110 may then store the data in the channel 112 along with fields indicating that the context of the connections, as is discussed above, and indicating that the stored information is data to be transferred. The first agent 110 may then also utilize the VMM 122 to notify the second agent 120 of the store operation, in the manner described above. After receiving notification of the store operation from the VMM 122, the second agent 120 may retrieve the data from the channel 112 and, on behalf of the first application 106, may transmit the data to the second application 116 by writing the data to the socket abstracting the first connection.

In various embodiments, the reverse transfer of data may also be possible. Second application 116 may write data to the socket abstracting the first connection, and the second agent 120 may then read the data from the socket on behalf of the first application 106 to which the data is being transferred. The second agent 120 may then store the data in the channel 112 along with fields indicating that the context of the connections, as is discussed above, and indicating that the stored information is data to be transferred. The second agent 120 may then also utilize the VMM 122 to notify the first agent 110 of the store operation, in the manner described above. After receiving notification of the store operation from the VMM 122, the first agent 110 may retrieve the data from the channel 112 and, on behalf of the second application 116, may transmit the data to the first application 106 by writing the data to the socket abstracting the first connection.

As is also shown, the second agent 120 listening on a port on behalf of a first application 106 may stop listening on that port when the first application 106 stops listening on the port. The first and second agents 110 and 120 may also close any connections associated with the port, such as the first and second connections described above. In some embodiments, the first agent 110 may trap a close port command from the first application 106 to the first stack 108 in the same manner that it trapped the above described listen request. Upon trapping the close port command, which may stop the first application from listening on the port and remove the application-port combination from the port table of the first stack 108, the first agent 110 may close the second connection associated with that port by closing the socket abstracting the second connection. The first agent 110 may then notify the second agent 120 of the close port command in the same manner it informed the second agent 120 of the listen request, as described above. Upon receiving notification of the close port command, second agent 120, acting on behalf of the first application 106, may issue a close port command to the second stack 118 to stop listening by the second agent 120 on the port. The second stack 118 may then remove the second agent 120—port combination from its port table. Further, the second agent 120 may close the first connection associated with that port by closing the socket abstracting the first connection.

In one embodiment, prior to the closing of either connection, an error may occur and may be determined by either the first or second agent 110/120. The error may be determined in any number of manners, such as an incomplete or corrupted/unreadable transmission retrieved from the channel 112. In response, the sensing agent 110/120 may close any connections and stop listening on any ports, and may notify the other agent 110/120 in the manner described above for transmitting notifications. The other agent 110/120 may then also close any connection and stop listening on any ports. Both first and second agents 110 and 120 may then attempt to re-initialize the channel 112 in the manner described above.

Figure 2:
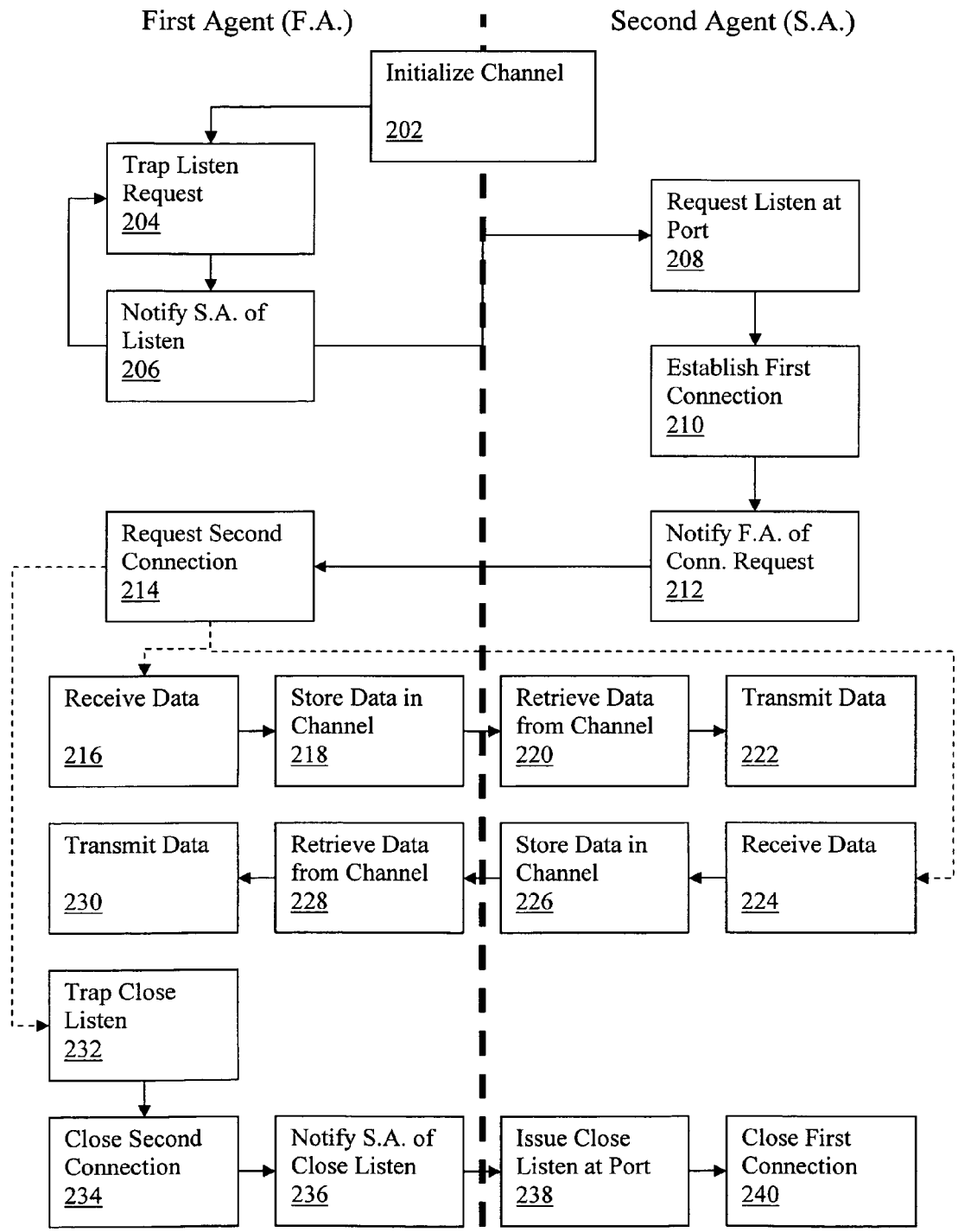
FIG. 2 illustrates a flow chart view of selected operations of the methods of various embodiments of the present invention.

FIG. 2 illustrates a flow chart view of selected operations of the methods of various embodiments of the present invention. As illustrated, in some embodiments, the first and second agents may each initialize the channel at start up, block 202. Each agent may request the memory location of the channel from the VMM through the API of the VMM. In various embodiments, the API of the VMM is known to the first and second agents. In response, the first and second agents may each receive the memory location of the channel, and may utilize the channel to communicate with the other of the first and second agents. In another embodiment, only one of the first and second agents may request the memory location of the channel at startup, block 202, and may request that the VMM notify the agents of other virtual machines of the memory location of the channel.

In various embodiments, the first and second agents may be adapted to cooperate to ensure that only a first application and the second agent listen at the same port, thereby synchronizing the first and second stacks. Referring to the example provided above of the first application acting as a server and the second application acting as a client, the first agent may trap the listen request made by first application, block 204. The first agent may trap the addition of a listening process in a number of ways. In some embodiments, the first agent may periodically check the port table of the first stack to determine if any ports have been added or removed. In other embodiments, the first agent may be notified each time a port is added or deleted from the port table. The notification may be provided by the first stack or by some other process monitoring the first stack and its port table. If any new applications are listening at new ports, such as the first application listening at a specified/assigned port, the first agent may generate a listen notification and may store the notification in the channel, notifying the second agent of the listening request, block 206. The notification may include the identity of the first application and the port number that the first application is listening at, as well as a type field indicating that the stored notification is notification of a listen event. Upon storing the notification, the first agent may further notify the VMM through the API of the VMM that something has been stored in the channel (the notification to the VMM may specify what has been stored in the channel, but need not do so). The VMM may then notify second agent, through the API of the VMM, that something has been stored in the channel. The second agent may then retrieve and process the stored notification. In response, the second agent may send a listen request to the second stack requesting to listen at the port that the first application is listening at, block 208. The second stack may then update its port table to reflect that the second agent is listening at the port. The second agent may then listen on the second stack on behalf of the first application, ensuring that all communications, such as data and connect requests, to the port are routed to the first application. Thus, by listening at ports on behalf of processes of virtual machines other than their own, the first and second agents ensure that the stacks of all virtual machines have the same list of ports being listened to by applications, thereby synchronizing the stacks.

In some embodiments, the first and second agents may be adapted to cooperate to facilitate network-like communication between the first application and the second application, with the first agent acting as a proxy for the second application and the second agent acting as a proxy for the first application, blocks 210-240. Continuing to refer to the above example with the first application acting as a server and the second application acting as a client, the first and second agents may facilitate the second application in establishing a network-like connection with the first application, blocks 210-214. The second agent may first receive a forwarded connect request from the second stack, the request made by the second application. The second agent may receive the forwarded request because the second agent is listening at the same port on the second stack as the first application is listening on the first stack, the second agent listening on behalf of the first application. Upon receiving the connection request, the second agent may establish a first connection by creating a socket abstracting the connection, block 210. The use of sockets to abstract connections is well known in the art.

The second agent, after establishing the first connection, block 210, may create a context to identify the connection and associate the context with the socket. The context may comprise, for example, 1) the IP address and the port of the first application to which the connection request is directed, 2) an indication of whether the second application is local or remote (here, it is local), and 3) an indication of the communication protocol used (TCP or UDP). Next, the second agent may generate a notification of the connection request comprising the above mentioned context and a field indicating the type of notification being generated, and may store the notification in the channel, notifying the first agent of the connection request, block 212. Upon storing the notification in the channel, the second agent may further notify the VMM through the API of the VMM that something has been stored in the channel (the notification to the VMM may specify what has been stored in the channel, but need not do so). The VMM may then notify the first agent, through the API of the VMM, that something has been stored in the channel.

In some embodiments, the first agent may then retrieve and process the notification. The first agent, acting as a proxy for the second application, may next request a connection to the first application, directing the request for connection to the first stack, block 214. The first stack may then forward the connection request to the first application, which may establish a second connection between the first application and the first agent, and may create another socket to abstract the second connection. The first agent may then map the other socket to the above described context, thus allowing the context to uniquely identify the connections associated with the two sockets.

As is further illustrated, the first and second agents may send data to and receive data from each other, blocks 216-230. The first application may write data to the socket abstracting the second connection, and the first agent may then read the data from the socket on behalf of the second application to which the data is being transferred, block 216. The first agent may then store the data in the channel, block 218, along with fields indicating the context of the connections, as is discussed above, and indicating that the stored information is data to be transferred. The first agent may then also utilize the VMM to notify the second agent of the store operation, in the manner described above. After receiving notification of the store operation from the VMM, the second agent may retrieve the data from the channel, block 220, and, on behalf of the first application, may transmit the data to the second application, block 222, by writing the data to the socket abstracting the first connection.

In various embodiments, the reverse transfer of data may also be possible, blocks 224-230. The second application may write data to the socket abstracting the first connection, and the second agent may then read the data from the socket on behalf of the first application to which the data is being transferred, block 224. The second agent may then store the data in the channel, block 226, along with fields indicating the context of the connections, as is discussed above, and indicating that the stored information is data to be transferred. The second agent may then also utilize the VMM to notify the first agent of the store operation, in the manner described above. After receiving notification of the store operation from the VMM, the first agent may retrieve the data from the channel, block 228, and, on behalf of the second application, may transmit the data to the first application, block 230, by writing the data to the socket abstracting the first connection.

As is also shown, the second agent listening on a port on behalf of a first application may stop listening on that port when the first application stops listening on the port, blocks 232-240. The first and second agents may also close any connections associated with the port, such as the first and second connections described above. In some embodiments, the first agent may trap a close port command from the first application to the first stack, block 232, in the same manner that it trapped the above described listen request. Upon trapping the close port command, which may stop the first application from listening on the port and remove the application-port combination from the port table of the first stack, the first agent may close the second connection associated with that port, block 234, by closing the socket abstracting the second connection. The first agent may then notify the second agent of the close port command, block 236, in the same manner it informed the second agent of the listen request, as described above. Upon receiving notification of the close port command, the second agent, acting on behalf of the first application, may issue a close port command to the second stack, and may stop listening on the port, block 238. The second stack may then remove the second agent-port combination from its port table. Further, the second agent may close the first connection associated with that port, block 240 by closing the socket abstracting the first connection.

FIG. 3 illustrates an example computer system suitable for use to practice various embodiments of the present invention. As shown, computing system 300 includes a number of processors or processor cores 302, and system memory 304. For the purpose of this application, including the claims, the terms "processor" and "processor cores" may be considered synonymous, unless the context clearly requires otherwise. Additionally, computing system 300 includes mass storage devices 306 (such as diskette, hard drive, compact disc read only memory (CDROM) and so forth), input/output devices 308 (such as keyboard, cursor control and so forth) and communication interfaces 310 (such as network interface cards, modems and so forth). The elements are coupled to each other via system bus 312, which represents one or more buses. In the case of multiple buses, they are bridged by one or more bus bridges (not shown). In various embodiments, mass storage devices 306 may be divided into multiple partitions for use by the virtual machines, with each virtual machine having exclusive use of the assigned partition.

Each of these elements performs its conventional functions known in the art. In particular, system memory 304 and mass storage 306 may be employed to store a working copy and a permanent copy of the programming instructions implementing the agent processes, the communication services/stacks of the various virtual machines, and so forth, herein collectively denoted as 322. As described earlier, each virtual machine may include an agent process. In various embodiments, the agent process may be a corresponding instance of an agent program of computer system 300 instantiated for the particular virtual machine. The agent may be implemented by assembler instructions supported by processor(s) 302 or high level languages, such as C, that can be compiled into such instructions.

The permanent copy of the programming instructions may be placed into permanent storage 306 in the factory, or in the field, through, for example, a distribution medium (not shown), such as a compact disc (CD), or through communication interface 310 (from a distribution server (not shown)). That is, one or more distribution media having an implementation of the agent program may be employed to distribute the agent and program various computing devices.

The constitution of these elements 302-312 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. An apparatus comprising:
one or more processors; and
an agent program instantiable into a first agent process of a first virtual machine operated by one of the one or more processors and a second agent process of a second virtual machine operated by one of the one or more processors, the first and second agent processes adapted to
first cooperate to ensure that a port of the apparatus is listened to by only a first application of the first virtual machine and by the second agent process of the second virtual machine, the second agent listening on the port on behalf of the first application to achieve synchronization of first and second network communication stacks of the first and second virtual machines, and said first cooperate includes trapping by the first agent process a first request from the first application to the first network communication stack of the first virtual machine requesting to listen on the port, and in response, notifying by the first agent process the second agent process of the listen request; and
second cooperate to facilitate the first application and a second application of the second virtual machine in communicating with each other in a network-like manner.

2. The apparatus of claim 1, wherein the apparatus further comprises a channel, and the first agent process is adapted to notify the second agent process of the listen request through the channel.

3. The apparatus of claim 1, wherein the first and second agent processes are adapted to said second cooperate, and said second cooperate comprises
the second agent process to establish a first connection to the second application through a second network communication stack in response to a second request of the second application to connect to the first application, the second agent process to act as a proxy for the first application,
the second agent process to notify the first agent process of the second request, and
the first agent process to make a third request to establish a second connection to the first application through the first network communication stack, the first agent process to act as a proxy for the second application.

4. The apparatus of claim 3, wherein the apparatus further comprises a channel, and the second agent process is adapted to notify the first agent process of the second request through the channel.

5. The apparatus of claim 4, wherein the first and second agent processes are adapted to said second cooperate, and said second cooperate further comprises
the first agent process to receive data transmitted from the first application to the second application through the second connection, the first agent process to act as a proxy for the second application,
the first agent process to store the data in the channel,
the second agent process to retrieve the data from the channel, and
the second agent process to transmit the data to the second application through the first connection, the second agent process to act as a proxy for the first application.

6. The apparatus of claim 5, wherein the first and second agent processes are adapted to said second cooperate, and said second cooperate further comprises the second agent process to receive data transmitted from the second application to the first application through the first connection, the second agent process to act as a proxy for the first application, the second agent process to store the data in the channel, the first agent process to retrieve the data from the channel, and the first agent process to transmit the data to the first application through the second connection, the first agent process to act as a proxy for the second application.

7. The apparatus of claim 3, wherein the first and second agent processes are adapted to third cooperate to close the first and second connections, and the closing comprises the first agent process to trap a fourth request from the first application to the first network communication stack to close the port, and in response, to close the second connection and to notify the second agent process of the fourth request, and the second agent process to receive the notification of the fourth request, and in response, to close the first connection and to issue a fifth request to the second network communication stack to close the port, the second agent process to act as a proxy for the first application.

8. The apparatus of claim 1, wherein the apparatus further comprises a channel and a virtual machine manager, and the first and second agent processes are adapted to initialize the channel by requesting a memory location of the channel from the virtual machine manager.

9. The apparatus of claim 8, wherein the channel is a persistent, low-level, shared memory page.

10. A method comprising:

trapping, by a first agent of a first virtual machine of a physical device, a first request from a first application of the first virtual machine to a first network communication stack of the first virtual machine requesting to listen on a port of the physical device;

notifying, by the first agent, a second agent of a second virtual machine of the physical device of the first request; and issuing, by the second agent, a second request to a second network communication stack of the second virtual machine requesting to listen on the port, the second agent listening on the port on behalf of the first application to achieve synchronization of the first and second network communication stacks of the first and second virtual machines.

11. The method of claim 10, wherein trapping the first request comprises periodically checking, by the first agent, a first TCP/UDP table of the first network communication stack to determine whether the first application is listening at a new port.

12. The method of claim 10, wherein trapping the first request comprises receiving, by the first agent, a notification that the first application is listening at a new port.

13. The method of claim 10, wherein notifying the second agent comprises notifying, by the first agent, the second agent of the first request through a channel of the physical device.

14. The method of claim 10, further comprising:

establishing, by the second agent, a first connection to a second application of the second virtual machine through the second network communication stack in response to a second request of the second application to connect to the first application, the second agent acting as a proxy for the first application;

notifying, by the second agent, the first agent of the second request; and making a third request, by the first agent, to establish a second connection to the first application through the first network communication stack, the first agent acting as a proxy for the second application.

15. The method of claim 14, further comprising:

receiving, by the first agent, data transmitted from the first application to the second application through the second connection, the first agent acting as a proxy for the second application;

storing, by the first agent, the data in a channel of the physical device;

retrieving, by the second agent, the data from the channel; and transmitting, by the second agent, the data to the second application through the first connection, the second agent acting as a proxy for the first application.

16. The method of claim 15, further comprising:

receiving, by the second agent, data transmitted from the second application to the first application through the first connection, the second agent acting as a proxy for the first application;

storing, by the second agent, the data in a channel of the physical device;

retrieving, by the first agent, the data from the channel; and transmitting, by the first agent, the data to the first application through the second connection, the first agent acting as a proxy for the second application.

17. The method of claim 14, further comprising:

trapping, by the first agent, a fourth request from the first application to the first network communication stack closing the port, and in response, closing the second connection, and notifying the second agent of the fourth request; and receiving, by the second agent, the notification of the fourth request, and in response, closing the first connection, and issuing a fifth request to the second network communication stack closing the port, the second agent acting as a proxy for the first application.

18. The method of claim 10, further comprising requesting, by the first and second agents, a memory location of a channel of the physical device from a virtual machine manager of the physical device to initialize the channel to facilitate communication between the first and second agents.

19. The method of claim 18, wherein requesting the memory location of the channel comprises requesting, by the first and second agents, the memory location of a persistent, low-level, shared memory page serving as the channel.

20. An article of manufacture comprising:

a storage medium; and a plurality of programming instructions designed to program a physical device and enable a first agent of a first virtual machine of the physical device and a second agent of a second virtual machine of the physical device to:

trap, by the first agent, a first request from a first application of the first virtual machine to a first network communication stack of the first virtual machine requesting to listen on a port of the physical device, notify, by the first agent, the second agent of the first request, and issue, by the second agent, a second request to a second network communication stack of the second virtual machine requesting to listen on the port, the second agent listening on the port on behalf of the first application to achieve synchronization of the first and second network communication stacks of the first and second virtual machines.

21. The article of claim 20, wherein the plurality of programming instructions further enables the first and second agents to:
establish, by the second agent, a first connection to a second application of the second virtual machine through the second network communication stack in response to a second request of the second application to connect to the first application, the second agent acting as a proxy for the first application;
notify, by the second agent, the first agent of the second request; and
make a third request, by the first agent, to establish a second connection to the first application through the first network communication stack, the first agent acting as a proxy for the second application.

22. The article of claim 21, wherein the plurality of programming instructions further enables the first and second agents to:
receive, by the first agent, data transmitted from the first application to the second application through the second connection, the first agent acting as a proxy for the second application;
store, by the first agent, the data in a channel of the physical device;
retrieve, by the second agent, the data from the channel; and
transmit, by the second agent, the data to the second application through the first connection, the second agent acting as a proxy for the first application.

23. The article of claim 22, wherein the plurality of programming instructions further enables the first and second agents to:
receive, by the second agent, data transmitted from the second application to the first application through the first connection, the second agent acting as a proxy for the first application;
store, by the second agent, the data in a channel of the physical device;
retrieve, by the first agent, the data from the channel; and
transmit, by the first agent, the data to the first application through the second connection, the first agent acting as a proxy for the second application.

24. A system comprising:
one or more processors;
volatile memory coupled to the one or more processors, including at least one channel to facilitate communication between a plurality of agent processes of a plurality of virtual machines of the system, the channel including a persistent, low-level, sharable memory page; and
a mass storage coupled to the one or more processors, and having stored therein an agent program instantiable into a first agent process of a first virtual machine operated by one of the one or more processors and a second agent process of a second virtual machine operated by one of the one or more processors, the first and second agent processes adapted to
first cooperate to ensure that a port of the apparatus is listened to by only a first application of the first virtual machine and by the second agent process of the second virtual machine, the second agent process to listen on the port on behalf of the first application to achieve synchronization of first and second network communication stacks of the first and second virtual machines, and said first cooperate includes trapping by the first agent process a first request from the first application to the first network communication stack of the first virtual machine requesting to listen on the port, and in response, notifying by the first agent process the second agent process of the listen request; and
second cooperate to facilitate the first application and a second application of the second virtual machine in communicating with each other in a network-like manner.

25. The system of claim 24, wherein the first and second agent processes are adapted to said second cooperate, and said second cooperate comprises
the second agent process to establish a first connection to the second application through a second network communication stack in response to a second request of the second application to connect to the first application, the second agent process to act as a proxy for the first application,
the second agent process to notify the first agent process of the second request, and
the first agent process to make a third request to establish a second connection to the first application through the first network communication stack, the first agent process to act as a proxy for the second application.

26. The system of claim 25, wherein the first and second agent processes are adapted to said second cooperate, and said second cooperate further comprises
the first agent process to receive data transmitted from the first application to the second application through the second connection, the first agent process acting as a proxy for the second application,
the first agent process to store the data in the channel,
the second agent process to retrieve the data from the channel, and
the second agent process to transmit the data to the second application through the first connection, the second agent process to act as a proxy for the first application.

27. The system of claim 26, wherein the first and second agent processes are adapted to said second, and said second cooperate further comprises
the second agent process to receive data transmitted from the second application to the first application through the first connection, the second agent process to act as a proxy for the first application,
the second agent process to store the data in the channel,
the first agent process to retrieve the data from the channel, and
the first agent process to transmit the data to the first application through the second connection, the first agent process to act as a proxy for the second application.

28. The system of claim 25, wherein the first and second agent processes are adapted to third cooperate to close the first and second connections, and the closing comprises the first agent process to trap a fourth request from the first application to the first network communication stack closing the port, and in response, to close the second connection and to notify the second agent process of the fourth request, and the second agent process to receive the notification of the fourth request, and in response, to close the first connection and to issue a fifth request to the second network communication stack to close the port, the second agent process to act as a proxy for the first application.

* * * * *